United States Patent [19]

Hart, Jr. et al.

[11] Patent Number: 4,717,266
[45] Date of Patent: Jan. 5, 1988

[54] LOW FRICTION FERROFLUID BEARING ARRANGEMENT

[75] Inventors: Edward E. Hart, Jr., Springfield; Joseph G. Patten, Troy, both of Ohio

[73] Assignee: Spectra-Physics, Inc., San Jose, Calif.

[21] Appl. No.: 873,409

[22] Filed: Jun. 12, 1986

[51] Int. Cl.$^4$ ............... F16C 32/04; F16J 15/40
[52] U.S. Cl. ................... 384/100; 384/133; 277/80; 310/90.5
[58] Field of Search ........... 384/99, 100, 107, 114, 384/113, 115, 116, 133; 277/80, 135; 310/90.5

[56] References Cited

U.S. PATENT DOCUMENTS

| | | |
|---|---|---|
| 3,734,578 | 5/1973 | Rosensweig ............ 310/90.5 |
| 3,746,407 | 7/1973 | Stiles et al. ............ 384/133 |
| 3,834,775 | 9/1974 | Tuffias et al. ........... 384/133 |
| 3,917,538 | 11/1975 | Rosensweig ............ 252/62.51 |
| 4,043,612 | 8/1977 | Orcutt ................. 384/133 X |
| 4,060,288 | 11/1977 | Arsenius et al. ......... 384/116 |
| 4,357,024 | 11/1982 | Raj .................... 277/80 X |
| 4,526,379 | 7/1985 | Raj .................... 277/80 |
| 4,630,943 | 12/1986 | Stahl et al. ............ 277/80 X |

OTHER PUBLICATIONS

Catalog of Standard and Replacement Ferrofluidic Feedthroughs, Ferrofluidics Corp., 40 Simon St., Nashua, NH 03061 (undated).

*Primary Examiner*—David Werner
*Attorney, Agent, or Firm*—Killworth, Gottman, Hagan & Schaeff

[57] ABSTRACT

A low friction bearing arrangement includes first and second poles of magnetically permeable material which define first and second pole surfaces which are spaced apart. The first and second poles also define first and second side surfaces, respectively, which are aligned. A quantity of ferrofluid, positioned intermediate the first and second pole surfaces and adjacent the first and second side surfaces, is held by means of a fringing magnetic flux between the first and second side surfaces at a level which extends beyond the side surfaces. A rotatable shaft of nonmagnetic material is supported on the quantity of ferrofluid and is held out of contact with the side surfaces thereby, such that the shaft may be freely rotated.

14 Claims, 5 Drawing Figures

LOW FRICTION FERROFLUID BEARING ARRANGEMENT

BACKGROUND OF THE INVENTION

The present invention relates to a low friction bearing arrangement and, more particularly, to such an arrangement in which a rotatable shaft is supported for free rotation by a quantity of ferrofluid.

A ferrofluid is a ferromagnetic fluid which may be magnetically polarized. The fluid is substantially uniform, and has the property that when a gradient magnetic field is applied to it, a body force is developed within the fluid which can substantially exceed the force of gravity applied to the fluid. Typically, a ferrofluid comprises a colloidal dispersion of finely divided magnetic particles of subdomain size whose liquid condition is unaffected by the presence of an applied magnetic field. The ferrofluid particles typically range in size up to about 300 A, the remain uniformly dispersed throughout the liquid carrier due to thermal agitation. Ferrofluids are discussed in U.S. Pat. No. 3,917,538, issued Nov. 4, 1975, to Rosensweig.

A principal application of ferrofluids in the past has been for use as low friction seals. In such a sealing arrangement, a shaft made of a magnetically permeable material defines one or more annular ridges which directly oppose an outer, annular pole piece. Magnetic flux is applied to a flux path including the shaft and the pole piece. The flux bridging the gaps between the ridges and the pole piece holds rings of ferrofluid in position therebetween. These rings of ferrofluid act as seals and preclude the passage of gas along the shaft.

Numerous bearing designs have been utilized in the past in various applications for supporting a rotatable shaft. Even with the best of such designs, however, the frictional forces resisting shaft movement may be greater than desired. Further, bearing wear may occur over extended periods of use. It is seen, therefore, that an improved bearing arrangement is needed in which a shaft may be mounted for rotation at extremely low frictional levels, and in which bearing life is extended.

SUMMARY OF THE INVENTION

This need is met by a low friction bearing arrangement, according to the present invention, which includes a first pole means of magnetically permeable material defining a first pole surface and a first side surface, and a second pole means of magnetically permeable material defining a second pole surface and a second side surface. The second pole surface faces the first pole surface, and the second side surface is aligned with the first side surface. The bearing arrangement further includes a nonmagnetic spacer means positioned between the first and second pole surfaces, and a quantity of ferrofluid positioned intermediate the first and second pole surfaces adjacent the first and second side surfaces. The bearing arrangement further includes means for supplying magnetic flux to a flux path including the first and second pole means, whereby magnetic flux extends between the first and second pole means and fringes outwardly therefrom beyond the first and second side surfaces so as to hold the ferrofluid between the first and second side surfaces at a level which extends beyond the side surfaces. Finally, the arrangement includes a rotatable shaft made of nonmagnetic material. The shaft is supported on the quantity of ferrofluid, out of contact with the side surfaces, and is freely rotatable.

The shaft may define an annular groove which is aligned with the quantity of ferrofluid, whereby axial movement of the shaft is inhibited. The first and second side surfaces may be curved, concave surfaces in which the quantity of ferrofluid defines a fluid bead extending around a portion of the periphery of the shaft in the annular groove. The shaft is free to rotate, but is restricted by the bead in its axial movement. The means for supplying magnetic flux may comprise a permanent magnet.

The first and second side surfaces may be generally cylindrical and axially aligned to define a cylindrical opening through which the shaft extends. The nonmagnetic spacer means may be generally annular in shape. The quantity of ferrofluid may then be configured as a generally annular shaped bead extending around the cylindrical opening. The means for supplying magnetic flux may comprise a generally annular, axially polarized permanent magnet, with the permanent magnet extending around the axially aligned with the opening.

The bearing arrangement may include magnetically permeable means, defining a generally cylindrical opening. The magnetically permeable means is configured to restrict flux flow therethrough in the region of the opening. The arrangement includes means for supplying magnetic flux to a flux flow path including the magnetically permeable means so as to produce fringing of the flux into the opening adjacent the area of restriction. A nonmagnetic shaft is positioned in the opening, and a quantity of ferrofluid is retained as a fluid bead around the opening by the fringing flux, supporting the shaft for free rotation. The shaft defines an annular groove extending circumferentially therearound for receiving a portion of the annular bead, whereby movement of the shaft axially is inhibited. The means for supplying magnetic flux may comprise a permanent magnet.

Accordingly, it is an object of the present invention to provide a low friction bearing arrangement which includes a quantity of ferrofluid supporting a shaft to permit free rotation of the shaft; to provide such a bearing arrangement in which the shaft is nonmagnetic; and to provide such a bearing arrangement in which the ferrofluid material is held in position by means of fringing magnetic flux.

Other objects and advantages of the invention will be apparent from the following description, the accompanying drawings and the appended claims.

DETAILED DESCRIPTION OF THE PREFERRED EMBODIMENTS

Figure 1:
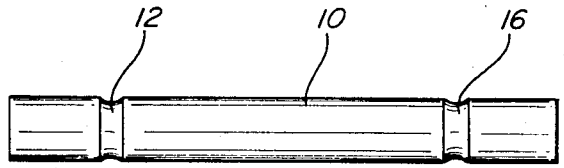
FIG. 1 is a side view of a shaft forming a part of the friction bearing arrangement of the present invention.
Figure 2:
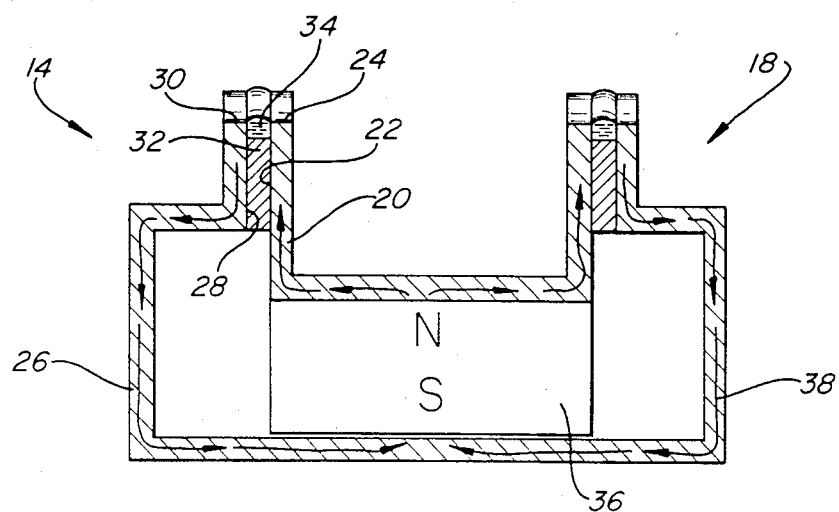
FIG. 2 is a sectional view taken generally along line 2—2 in FIG. 3, depicting a first embodiment of the bearing of the present invention.
Figure 3:
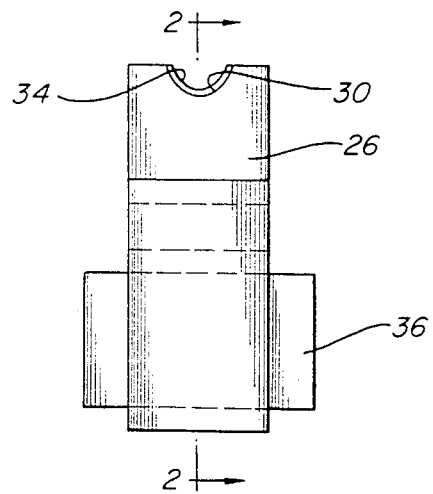
FIG. 3 is an end view of the bearing, as seen looking left to right in FIG. 2.
Figure 4:
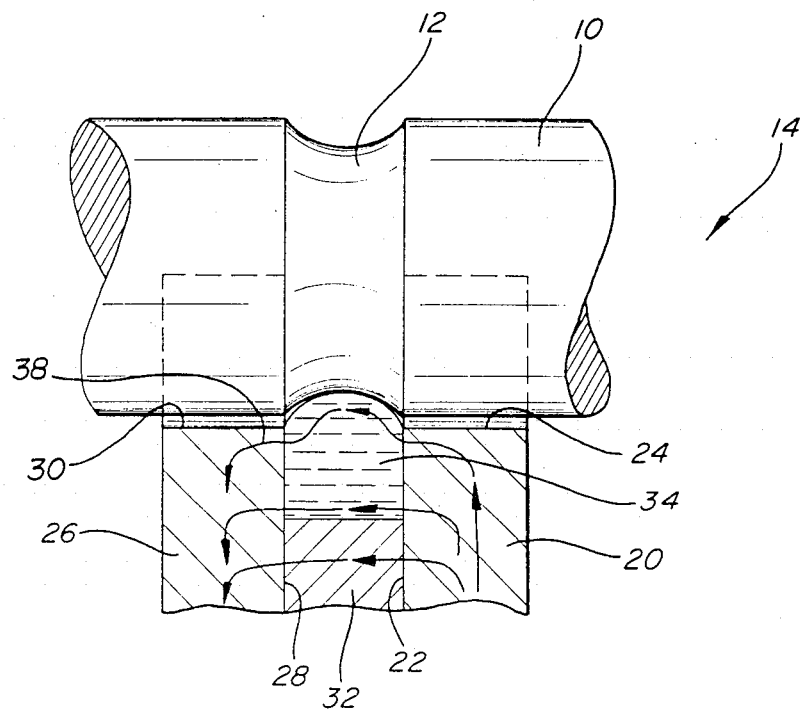
FIG. 4 is an enlarged sectional view of a portion of the first embodiment, illustrating the manner in which the ferrofluid is held in position.

FIGS. 1-4 illustrate a first embodiment of the low friction bearing arrangement of the present invention. A shaft 10 is supported at annular groove 12 by bearing 14 and at annular groove 16 by bearing 18. The discussion below will be directed primarily to the bearing 14, it being understood that bearing 18 is identical in construction and operation and simply supports the shaft 10 at an axially spaced position so as to stabilize the shaft.

The bearing arrangement includes a first pole means 20 which is made of a magnetically permeable material, such as for example iron. The first pole means defines a first pole surface 22 and a first side surface 24. A second pole means 26, also made of magnetically permeable material, defines a second pole surface 28 and a second side surface 30. The second side surface 30 is aligned with the first side surface 24. Positioned between the first pole surface 22 and the second pole surface 28 is a nonmagnetic spacer means 32 which, for example, may be made of brass, aluminum, or the like. A quantity of ferrofluid 34 is positioned intermediate the first and second pole surfaces, 22 and 28, respectively, and adjacent the first and second side surfaces 24 and 30, respectively.

A means for supplying a magnetic flux to a flux path preferably includes permanent magnet 36, which is polarized as indicated. The flux path includes the first pole means 20 and the second pole means 26, with the flux path being illustrated schematically by arrows 38.

As best seen in FIG. 4, and again illustrated by arrows 38, the flux extends between the first and second pole means 20 and 26 and fringes outwardly therefrom beyond the first and second side surfaces 24 and 30, so as to hold the ferrofluid between the first and second side surfaces at a level which extends above these side surfaces. The rotatable shaft 10 is supported on the quantity of ferrofluid 34 and is thereby held out of contact with the side surfaces 24 and 30 such that the shaft is freely rotatable. The groove 12 of shaft 10 is aligned with the quantity of ferrofluid 34 and a portion of this fluid is received within the groove 12. The magnetic fringing field maintains the ferrofluid in its raised configuration and, as a consequence, the fluid 34 and the groove 12 act together to resist axial movement of the shaft.

In the embodiment of FIGS. 1-4, the first and second side surfaces 24 and 30, respectively, are curved, concave surfaces which extend partially around the periphery of the shaft 10. As a consequence, in this embodiment the shaft is not restrained from upward movement.

It will be appreciated that it is important that the shaft is made of a nonmagnetic material such as aluminum. If shaft 10 were to be made of a magnetic material, the fringing flux bridging pole means 20 and 26 would tend to draw the shaft 10 toward side surfaces 24 and 30, with the result that frictional forces could be produced if contact were made between the shaft and surfaces 24 and 30. Further, the presence of a shaft made of a magnetic material would alter the pattern of the fringing flux and would therefore alter the effect which such flux has upon the ferrofluid 34.

Figure 5:
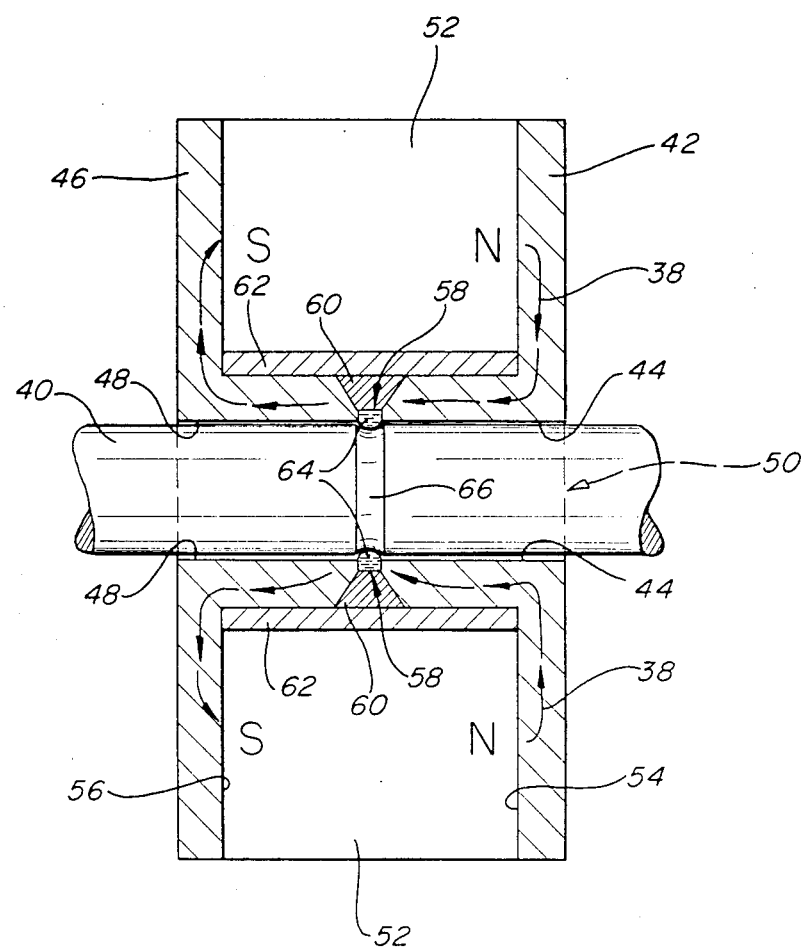
FIG. 5 is a sectional view, taken along a diameter, of a second, generally cylindrical embodiment of the present invention.

Reference is now made to FIG. 5 which illustrates a second embodiment of the present invention in which the shaft 40 is completely surrounded by the bearing. All of the bearing elements are generally annular in shape. It will be appreciated that it may be desirable to utilize a second such bearing with shaft 40, in the manner illustrated in respect to the first embodiment of the invention, in order to provide a stable support for shaft 40.

The bearing arrangement includes a first pole means 42 of magnetically permeable material defining a generally cylindrical side surface 44, and a second pole means 46 of magnetically permeable material defining a second side surface 48. Cylindrical surfaces 44 and 48 are axially aligned and together define a cylindrical opening 50 through which the shaft 40 extends.

A means for supplying magnetic flux to a flux path includes a generally annular permanent magnet 52 which is axially polarized, as shown, with one pole facing surface 54 of the first pole means 42 and the opposite pole facing surface 56 of the second pole means 46. The flux path includes the first and second pole means, as indicated by arrows 38, such that flux fringes from the pole means in the region of an annular gap, indicated at 58. Fringing of the flux at the annular gap occurs toward the shaft 40. A generally annular spacer element 60 fills a portion of this gap, with a secondary spacer 62 positioned between spacer 60 and the annular permanent magnet 52. A quantity of ferrofluid 64 is held between the pole means 42 and 46 in contact with the shaft 40 and within a groove 66 defined by the shaft. The ferrofluid is held in this position by the flux which fringes from the pole means 42 and 46. As a consequence, since the shaft 40 does not contact surfaces 44 and 48, but rather only the fluid 64, the shaft 40 is supported by the ferrofluid for free rotation.

As stated previously, the ferrofluid 64 is positioned between the pole means 42 and 46 in the embodiment of FIG. 5, and the ferrofluid 34 is positioned between the pole means 20 and 26 in the embodiment of FIGS. 1-4. By these statements, it is meant that the ferrofluid material is positioned adjacent the gap between the pole means so as to be affected by fringing flux. Although the ferrofluid is shown as filling a space between opposing faces of the two poles, this space may be completely filled, if desired, by a nonmagnetic spacing element such that the ferrofluid is contained entirely radially within the side surfaces of the pole means.

The two embodiments described above and illustrated in the drawings each include a gap between a pair of pole means. Such a gap may, however, not be necessary if sufficiently high flux levels are provided. If the flux is caused to pass through a region of a magnetically permeable member which is reduced sufficiently in its cross-sectional area so as to saturate the member, fringing of the flux may be produced. Such fringing may be utilized to hold an annular bead of ferrofluid material in place. The ferrofluid bead may therefore be used to support a shaft, while permitting the shaft to rotate freely. It will be further appreciated that while the above described embodiments include permanent magnets as the sources of magnetic flux, electromagnets may also be used.

It will be appreciated that the bearing arrangement of the present invention is advantageous in that the shaft is free to turn, with extremely low frictional resistance. Additionally, since the shaft is supported only by means of the ferrofluid, bearing parts are not subject to wear over extended periods of use.

Having described the invention in detail and by reference to preferred embodiments thereof, it will be apparent that modifications and variations are possible without departing from the scope of the invention defined in the appended claims.

What is claimed is:

1. A low friction bearing arrangement, comprising:
   first pole means of magnetically permeable material defining a first pole surface and a first side surface,
   second pole means of magnetically permeable material defining a second pole surface and a second side surface, said second pole surface facing said first pole surface and second side surface being aligned with said first side surface,
   nonmagnetic spacer means extending between and contacting said first and second pole surfaces,
   a quantity of ferrofluid positioned intermediate said first and second pole surfaces and adjacent said first and second side surfaces,
   means for supplying magnetic flux to a flux path including said first and second pole means, whereby magnetic flux extends between said first and second pole means and fringes outwardly therefrom beyond said first and second side surfaces so as to hold said ferrofluid between said first and second side surfaces at a level which extends beyond said side surfaces, and
   a rotatable shaft of nonmagnetic material, supported on said quantity of ferrofluid and held out of contact with said side surfaces thereby, such that said shaft is freely rotatable.

2. The bearing arrangement of claim 1 in which said shaft defines an annular groove which is aligned with said quantity of ferrofluid, whereby axial movement of said shaft is inhibited.

3. The bearing arrangement of claim 2 in which said first and second side surfaces are curved concave surfaces, and in which said quantity of ferrofluid defines a fluid bead extending around a portion of the periphery of said shaft in said annular groove, whereby said shaft is free to rotate but is restricted in its axial movement.

4. The bearing arrangement of claim 1 in which said means for supplying magnetic flux comprises a permanent magnet.

5. The bearing arrangement of claim 2 in which said first and second side surfaces are generally cylindrical and axially aligned to define a cylindrical opening through which said shaft extends, in which said nonmagnetic spacer means is generally annular in shape, and in which said quantity of ferrofluid is configured as a generally annular-shaped bead extending around said cylindrical opening.

6. The bearing arrangement of claim 5 in which said means for supplying magnetic flux comprises a generally annular, axially polarized permanent magnet, said permanent magnet extending around and axially aligned with said opening.

7. A bearing arrangement, comprising:
   first and second pole means of magnetically permeable material, each defining a side surface, said first and second pole means being spaced apart such that said side surfaces are aligned,
   a shaft of nonmagnetic material positioned adjacent said side surfaces,
   means for supplying magnetic flux to a flux path including said first and second pole means such that flux fringes from said pole means toward said shaft,
   nonmagnetic spacer means extending between and contacting said first and second pole means and spaced from said shaft, and
   a quantity of ferrofluid held between said pole means, said spacer means and said shaft, in contact with said shaft, such that said shaft is supported by said ferrofluid for free rotation.

8. The bearing arrangement of claim 7 in which said shaft defines an annular groove which receives a portion of said quantity of ferrofluid such that axial movement of said shaft is inhibited.

9. The bearing arrangement of claim 7 in which said side surfaces are curved concave surfaces and in which said quantity of ferrofluid defines a fluid bead extending around at least a portion of said shaft.

10. The bearing arrangement of claim 7 in which said means for supplying magnetic flux comprises a permanent magnet.

11. The bearing arrangement of claim 7 in which said side surfaces are cylindrical, axially aligned surfaces which define a cylindrical opening through which said shaft extends and in which a spacer is positioned between said pole means to limit the amount of ferrofluid which can flow directly between said pole means.

12. A bearing arrangement, comprising:
    magnetically permeable means, defining a generally cylindrical opening, and configured to restrict flux flow therethrough in the region of said opening,
    means for supplying magnetic flux to a flux flow path including said magnetically permeable means so as to produce fringing of said flux into said opening,
    a nonmagnetic shaft positioned in said opening and defining an annular groove extending circumferentially therearound, and
    a quantity of ferrofluid, retained in said opening and said annular groove by fringing flux, and supporting said shaft for free rotation.

13. The bearing arrangement of claim 12 in which said flux fringes around the periphery of said opening, thereby retaining said ferrofluid as a fluid bead which extends around said opening.

14. The bearing arrangement of claim 12 in which said means for supplying magnetic flux comprises a permanent magnet.

* * * * *